United States Patent [19]

Kagoshima

[11] Patent Number: 5,761,374
[45] Date of Patent: Jun. 2, 1998

[54] METHOD AND APPARATUS FOR REPRODUCING INFORMATION FROM A VIDEO DISC

[75] Inventor: Junichi Kagoshima, Sagamihara, Japan

[73] Assignee: Victor Company of Japan, Ltd., Yokohama, Japan

[21] Appl. No.: 661,875

[22] Filed: Jun. 12, 1996

[51] Int. Cl.$^6$ .............................. H04N 5/781; H04N 5/85
[52] U.S. Cl. .................................. 386/125; 386/126
[58] Field of Search .......................... 386/125, 126, 386/81, 82, 70, 46; 369/32; 360/32; H04N 5/781, 5/85

[56] References Cited

U.S. PATENT DOCUMENTS 5,191,567  3/1993  Yasuda et al. .................. 369/32
5,594,709  1/1997  Nagano et al. .................. 369/32

*Primary Examiner*—Robert Chevalier
*Attorney, Agent, or Firm*—Pollock, Vande Sande & Priddy

[57] ABSTRACT

A video disc has sector-corresponding PSD data portions. A memory has divided regions corresponding to banks respectively. The sector-corresponding PSD data portions are dumped from the video disc to the banks of the memory respectively. A detection is made as to whether or not a desired sector-corresponding PSD data portion is in the memory. The desired sector-corresponding PSD data portion is read out from the memory when the desired sector-corresponding PSD data portion is in the memory. When the desired sector-corresponding PSD data portion is not in the memory, the desired sector-corresponding PSD data portion is dumped from the video disc to a bank of the memory which has not yet been subjected to a data reading process.

12 Claims, 8 Drawing Sheets

FIG. 2

|   | 0 | 0 | 0 | 0 | 0 | 0 | 0 | 0 | 0 | 0 |
|---|---|---|---|---|---|---|---|---|---|---|
| A | 0 | 1 | 2 | 3 | 4 | 5 | 6 | 7 | 8 | 9 |

|   | 1 | 0 | 1 | 1 | 0 | 1 | 0 | 0 | 1 | 0 |
|---|---|---|---|---|---|---|---|---|---|---|
| B | 0 | 1 | 2 | 3 | 4 | 5 | 6 | 7 | 8 | 9 |

|   | 1 | 0 | 1 | 1 | 0 | 1 | 0 | 0 | 1 | 1 |
|---|---|---|---|---|---|---|---|---|---|---|
| C | 0 | 1 | 2 | 3 | 4 | 5 | 6 | 7 | 8 | 19 |

|   | 1 | 0 | 1 | 1 | 1 | 1 | 1 | 1 | 1 | 1 |
|---|---|---|---|---|---|---|---|---|---|---|
| D | 0 | 1 | 2 | 3 | 18 | 5 | 16 | 15 | 8 | 19 |

|   | 0 | 0 | 0 | 1 | 1 | 1 | 1 | 1 | 1 | 1 |
|---|---|---|---|---|---|---|---|---|---|---|
| E | 0 | 1 | 2 | 3 | 18 | 5 | 16 | 15 | 8 | 19 |

|   | 0 | 0 | 0 | 1 | 1 | 1 | 1 | 1 | 1 | 1 |
|---|---|---|---|---|---|---|---|---|---|---|
| F | 0 | 1 | 2 | 3 | 18 | 5 | 16 | 15 | 8 | 19 |

METHOD AND APPARATUS FOR REPRODUCING INFORMATION FROM A VIDEO DISC

BACKGROUND OF THE INVENTION

1. Field of the Invention

This invention relates to a method of reproducing information from a video disc such as a video CD (compact disc) or a DVD (digital video disc). This invention also relates to an apparatus for reproducing information from a video disc such as a video CD or a DVD.

2. Description of the Prior Art

A video CD playback apparatus can operate in various modes including a playback control (PBC) mode. The video CD playback apparatus includes a memory for PSD (play sequence descriptor) data. A video CD is now assumed which has PSD data smaller in size or volume than the PSD data memory in the video CD playback apparatus. During the PBC-mode operation of the playback apparatus on such a video CD, after the PSD data is dumped once from the video CD to the PSD data memory in the playback apparatus, re-dumping of the PSD data continues to be unnecessary until the video CD is replaced by another. In the case of a video CD having PSD data greater in size or volume than the PSD data memory in the video CD playback apparatus, re-dumping of the PSD data is executed at a suitable timing to maintain the PBC-mode operation of the playback apparatus.

In the case where the reproduction of main information from video CD is restarted after being interrupted, the reproduction restart from a point corresponding to the interruption is available provided that a user operates the video CD playback apparatus to move an optical pickup head to a place corresponding to the interruption.

A video CD is now assumed which has PSD data considerably greater in size or volume than the PSD data memory in the video CD playback apparatus. In the case of such a video CD, PSD information in the PSD data memory is updated each time the PSD data is re-dumped from the video CD to the PSD data memory. Accordingly, during the reproduction of main information from such a video CD, when a currently-accessed point on the video CD is required to move back from the present list area to the immediately-preceding list area, it is necessary to re-dump the PSD data from the video CD to the PSD data memory. The re-dumping of the PSD data results in seeking motion of the optical pickup head toward the inner edge of the video CD, thereby causing a waiting time.

Generally, regarding a video CD containing information of a movie, the time of one track (one program) is relatively long. In the case where the reproduction of main information from a video CD is restarted after being interrupted, the reproduction point which occurs at or immediately before the moment of the interruption can be found only by a manually-based searching process. Accordingly, it tends to take a long time to restart the reproduction at the point corresponding to the interruption.

SUMMARY OF THE INVENTION

It is a first object of this invention to provide an improved method of reproducing information from a video disc such as a video CD (compact disc) or a DVD (digital video disc).

It is a second object of this invention to provide an improved apparatus for reproducing information from a video disc such as a video CD or a DVD.

A first aspect of this invention provides a reproducing apparatus for a video disc which comprises a memory having divided regions corresponding to banks respectively; first means for dumping sector-corresponding PSD data portions from the video disc to the banks of the memory respectively; second means for detecting whether or not a desired sector-corresponding PSD data portion is in the memory; third means for reading out the desired sector-corresponding PSD data portion from the memory when the first means detects that the desired sector-corresponding PSD data portion is in the memory; and fourth means for, when the first means detects that the desired sector-corresponding PSD data portion is not in the memory, dumping the desired sector-corresponding PSD data portion from the video disc to a bank of the memory which has not yet been subjected to a data reading process by the third means.

A second aspect of this invention is based on the first aspect thereof, and provides a reproducing apparatus further comprising fifth means for, when the video disc is replaced by a second video disc having sector-corresponding PSD data portions whose number is smaller than the number of the banks of the memory, dumping the sector-corresponding PSD data portions from the second video disc to banks out of the banks of the memory respectively while keeping the sector-corresponding PSD data portion in each remaining bank of the memory.

A third aspect of this invention is based on the second aspect thereof, and provides a reproducing apparatus further comprising sixth means for, when the second video disc is replaced by the previous video disc, dumping sector-corresponding PSD data portions from the previous video disc to banks of the memory which have been occupied by the sector-corresponding PSD data portions related to the second video disc.

A fourth aspect of this invention provides a method of reproducing information from a video disc which comprises the steps of dumping sector-corresponding PSD data portions from the video disc to banks of a memory respectively; detecting whether or not a desired sector-corresponding PSD data portion is in the memory; reading out the desired sector-corresponding PSD data portion from the memory when the desired sector-corresponding PSD data portion is in the memory; and when the desired sector-corresponding PSD data portion is not in the memory, dumping the desired sector-corresponding PSD data portion from the video disc to a bank of the memory which has not yet been subjected to a data reading process.

A fifth aspect of this invention is based on the fourth aspect thereof, and provides a method further comprising the steps of when the video disc is replaced by a second video disc having sector-corresponding PSD data portions whose number is smaller than the number of the banks of the memory, dumping the sector-corresponding PSD data portions from the second video disc to banks out of the banks of the memory respectively while keeping the sector-corresponding PSD data portion in each remaining bank of the memory; and when the second video disc is replaced by the previous video disc, dumping sector-corresponding PSD data portions from the previous video disc to banks of the memory which have been occupied by the sector-corresponding PSD data portions related to the second video disc.

A sixth aspect of this invention is based on the fourth aspect thereof, and provides a method further comprising the steps of reproducing main information from the video disc in response to a sector-corresponding PSD data portion read out from the memory; when the reproduction of the main information from the video disc is interrupted, storing a list offset value representing a position corresponding to the occurrence of the interruption of the reproduction; and when the reproduction of the main information from the video disc is required to be restarted, retrieving the list offset value and restarting the reproduction from the position represented by the retrieved list offset value.

A seventh aspect of this invention is based on the fourth aspect thereof, and provides a method further comprising the steps of reproducing main information from the video disc in response to a sector-corresponding PSD data portion read out from the memory;

when the reproduction of the main information from the video disc is interrupted, storing an address representing a position corresponding to the occurrence of the interruption of the reproduction; and when the reproduction of the main information from the video disc is required to be restarted, retrieving the address and restarting the reproduction from the position represented by the address.

An eighth aspect of this invention is based on the fourth aspect thereof, and provides a method further comprising the steps of when reproducing main information from the video disc is required, deciding whether or not the video disc conforms to given standards; reading a start list offset value and starting the reproduction of the main information from the video disc in response to the start list offset value in cases where the video disc conforms to given standards; and reading a start address and starting the reproduction of the main information from the video disc in response to the start address in cases where the video disc does not conform to given standards.

BRIEF DESCRIPTION OF THE DRAWINGS

FIG. 2 is a diagram of conditions of PSD data in a PSD data memory which occur at different stages.

DESCRIPTION OF THE PREFERRED EMBODIMENTS

First Embodiment

Figure 1:
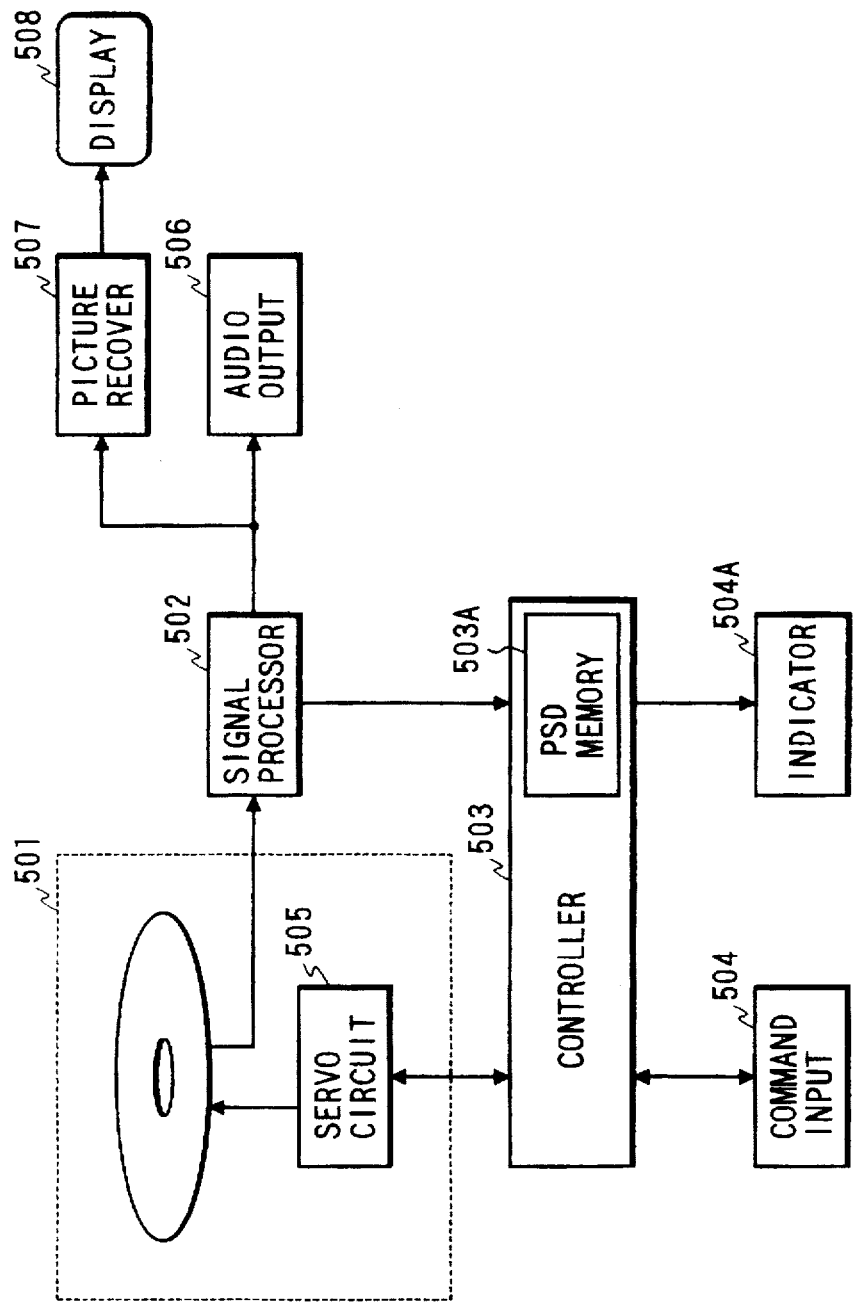
FIG. 1 is a block diagram of a reproducing apparatus according to a first embodiment of this invention.

FIG. 1 shows a first embodiment of this invention. With reference to FIG. 1, an adaptor connected to a CD player 501 includes a signal processor 502, a controller 503, an input device 504, an indicator 504A, an audio output device 506, a picture recovering processor 507, and a display 508. In general, the CD player 501 includes a servo circuit 505. The servo circuit 505 may be located in the adaptor.

The signal processor 502 is connected to the CD player 501, the controller 503, the audio output device 506, and the picture recovering processor 507. The controller 503 is connected to the input device 504, the indicator 504A, and the servo circuit 505. The picture recovering processor 507 is connected to the display 508.

The controller 503 includes a CPU, a microcomputer, or a similar device which has a combination of an input/output port, a signal processing section, a ROM, and a RAM. The controller 503 operates in accordance with a control program stored in the ROM.

A signal having video information and audio information is reproduced from a video CD by the CD player 501. The reproduced signal is transmitted from the CD player 501 to the signal processor 502. The reproduced signal is subjected by the signal processor 502 to a CD decoding process inverse with respect to a CD encoding process. The resultant reproduced signal is fed from the signal processor 502 to the controller 503. In addition, the resultant reproduced signal is separated by the signal processor 502 into a reproduced video signal and a reproduced audio signal fed to the picture recovering processor 507 and the audio output device 506 respectively. The reproduced video signal is subjected by the picture recovering processor 507 to a picture recovering process such as an MPEG decoding process inverse with respect to an MPEG encoding process. As a result, original video information is recovered from the reproduced video signal. The picture recovering processor 507 informs the display 508 of the recovered original video information so that the display 508 visualizes the recovered original video information. On the other hand, the audio output device 506 generates sound in response to the reproduced audio signal.

When a disc is placed in position within the CD player 501, TOC (table of contents) information is read out from the present disc. An output signal of the CD player 501 which contains the TOC information is processed by the signal processor 502. The signal processor 502 recovers the TOC information, and feeds the recovered TOC information to the controller 503. The controller 503 detects or recognizes the type of the present disc by referring to the TOC information. The controller 503 generates a signal representing the type of the disc, and outputs the disc type signal to the indicator 504A. Information of the type of the present disc is visualized by the indicator 504A.

When the input device 504 is actuated by a user to designate the identification number or the order number of a desired tune (a desired program), the input device 504 generates a signal representing the order number of the desired tune. The input device 504 outputs the signal of the desired-tune order number to the controller 503. The controller 503 generates a control signal in response to the signal of the desired-tune order number and outputs the generated control signal to the servo circuit 505, thereby controlling the servo circuit 505 to move a currently-accessed point on the present disc to a position corresponding to the start of the desired tune.

PSD (play sequence descriptor) data will now be described. PSD data is written on each video CD of the version "2.0" during the manufacture thereof. The PSD data represents a playback sequence. The PSD data is recorded on a given place within an inner portion of the video CD of the version "2.0". In the case where a video CD of the version "2.0" is placed in position within the CD player 501 and reproduction start (playback start) is commanded by actuating the input device 504, the present video CD starts to be scanned by an optical pickup head in the CD player 501 so that TOC information and PSD data are read out therefrom. The TOC information and the PSD data are transmitted from the CD player 501 to the controller 503 via the signal processor 502. The TOC information and the PSD data are written into the RAM within the controller 503. The RAM within the controller 503 has a portion for storing PSD data. This portion of the RAM is also referred to as the PSD data memory 503A.

The size of the PSD data memory 503A is equal to, for example, 10 sectors. According to the CD standards, one sector corresponds to 2,352 bytes. The PSD data memory 503A is divided into regions or banks corresponding to sectors respectively. One bank corresponds to 2,048 bytes equal to 256 by 8 bytes. PSD data reproduced from a video CD of the version "2.0" is divided into sector-corresponding portions while unrelated portions (unnecessary portions) are removed from the reproduced PSD data to reduce a 1-sector size into agreement with a 1-bank size. The removal of the unrelated portions from the reproduced PSD data is executed by the signal processor 502. The sector-corresponding portions of the PSD data are sequentially written into the banks of the PSD data memory 503A respectively. Thus, during the writing of the PSD data into the PSD data memory 503A, the sector-corresponding portions of the PSD data are made into correspondence with the banks of the PSD data memory respectively.

In the case of a video CD of the version "2.0" which has PSD data of a size equal to 20 sectors, first to tenth sector-corresponding portions of the PSD data are dumped from the video CD to the banks of the PSD data memory 503A respectively. The sector-corresponding portions of the PSD data are identified by sector order numbers equal to "0", "1", "2", ..., "19", respectively. As shown in the part "A" of FIG. 2, the first to tenth sector-corresponding portions of the PSD data are sequentially stored in the respective banks of the PSD data memory 503A.

It is now assumed that during PBC-mode (playback control-mode) operation of the reproducing apparatus or during the reproduction of main information from the video CD, the sector-corresponding portions of the PSD data in the PSD data memory 503A are accessed which correspond to sector order numbers of "0", "2", "3", "5", and "8" respectively. In this case, access flags related to the respective banks of the PSD data memory 503A change to conditions shown in the part "B" of FIG. 2. Specifically, the access flags related to the accessed memory banks are set to "1". Signals representing the respective access flags are stored in a given region of the RAM within the controller 503.

When the sector-corresponding portion of the PSD data which corresponds to a sector order number of "19" is required, a re-dumping process is executed since this sector-corresponding portion of the PSD data is absent from the PSD data memory 503A. During the re-damping process, the sector-corresponding portion of the PSD data which corresponds to a sector order number of "19" is dumped from the video CD to the last one of the banks of the PSD data memory 503A which have not yet been accessed. Thus, as shown in the part "C" of FIG. 2, in the last one of the unaccessed banks, the sector-corresponding portion of the PSD data which corresponds to a sector order number of "9" is replaced by the sector-corresponding portion of the PSD data which corresponds to a sector order number of "19". At the same time, the access flag related to the last one of the unaccessed banks is set to "1".

As previously described, during the PBC-mode operation of the reproducing apparatus or during the reproduction of main information from the video CD, one sector-corresponding portion of the PSD data is replaced by another each time a re-dumping process is executed. In the case where re-dumping processes are executed so that the sector-corresponding portions of the PSD data which correspond to sector order numbers of "15", "16", and "18" are dumped from the video CD to the PSD data memory 503A, the PSD data in the PSD data memory 503A assumes conditions such as shown in the part "D" of FIG. 2. Under the conditions in the part "D" of FIG. 2, when the PBC-mode operation of the reproducing apparatus is returned or reversed in playback direction, a re-dumping process does not occur since all the sector-corresponding portions of the PSD data which are previously accessed remain in the PSD data memory 503A.

In the case where the video CD (the first video CD) in the reproducing apparatus is replaced by another (a second video CD) and the PBC-mode operation of the reproducing apparatus is restarted, sector-corresponding portions of PSD data are sequentially dumped from the new video CD to the first and later banks of the PSD data memory 503A respectively. When the size of the PSD data in the new video CD is equal to 3 sectors, the first to third sector-corresponding portions of the PSD data are dumped from the new video CD to the first to third banks of the PSD data memory 503A respectively as shown in the part "E" of FIG. 2. Thus, in the first to third banks of the PSD data memory 503A, the sector-corresponding portions of the previous PSD data are replaced by the sector-corresponding portions of the new PSD data respectively. At the same time, the access flags related to the first to third banks of the PSD data memory 503A are cleared and reset to "0", and information of the bank size of the new PSD data is stored.

In the case where the video CD (the second video CD) in the reproducing apparatus is replaced by previous one (the first video CD) and the PBC-mode operation of the reproducing apparatus is restarted, the first to third sector-corresponding portions of the PSD data are sequentially dumped from the first video CD to the first to third banks of the PSD data memory 503A respectively as shown in the part "F" of FIG. 2. Thus, in the first to third banks of the PSD data memory 503A, the sector-corresponding portions of the second-CD PSD data are replaced by the sector-corresponding portions of the first-CD PSD data respectively. The PSD data in the fourth and later banks of the PSD data memory 503A is not updated since it relates to the first video CD. It should be noted that the conditions of the PSD data in the part "F" of FIG. 2 are equivalent to the conditions of the PSD data in the part "D" of FIG. 2.

Figure 3:
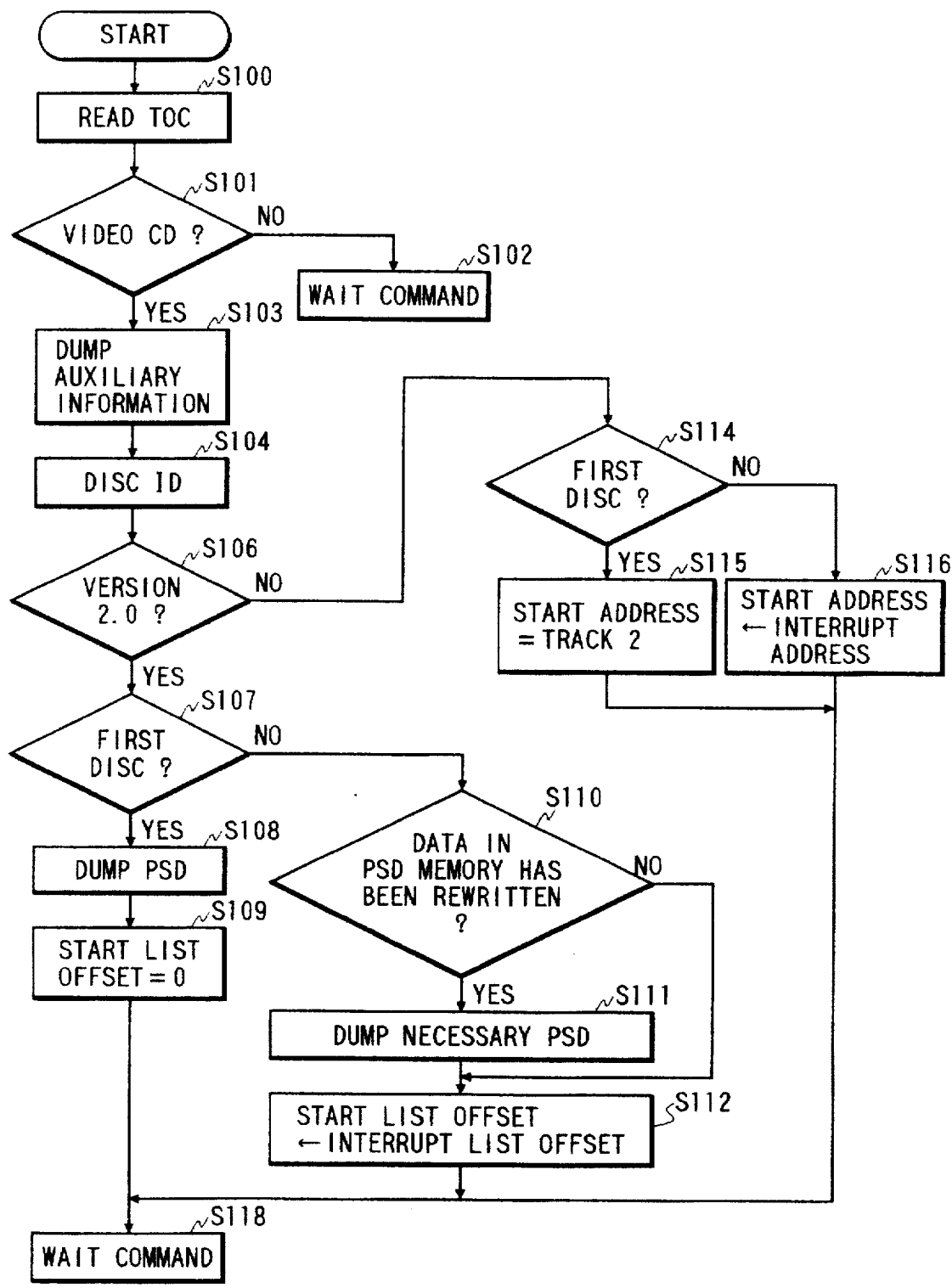
FIG. 3 is a flowchart of a first segment of a control program for a controller in FIG. 1.

As previously described, the controller 503 operates in accordance with a control program stored in the internal ROM. FIG. 3 is a flowchart of a first segment of the control program for the controller 503. The program segment in FIG. 3 is started when a disc is placed in position within the CD player 501.

As shown in FIG. 3, a first step S100 of the program segment reads out TOC information from the present disc. A step S101 following the step S100 decides whether or not the present disc agrees with a video CD by referring to the TOC information. When the present disc agrees with a video CD, the program advances from the step S101 to a step S103. Otherwise, the program advances from the step S101 to a step S102. The step S102 waits a next command inputted via the input device 504.

The step S103 dumps ID-containing auxiliary information (disc information) from the present disc to the RAM within the controller 503. A step S104 following the step S103 extracts disc ID (identification) information from the auxiliary information.

A step S106 subsequent to the step S104 decides whether or not the present disc is of the version "2.0" by referring to the disc ID information. When the present disc is of the version "2.0", the program advances from the step S106 to a step S107. Otherwise, the program advances from the step S106 to a step S114.

The step S107 decides whether or not the present disc is placed in the CD player 501 for the first time. When the present disc is placed in the CD player 501 for the first time, the program advances from the step S107 to a step S108. Otherwise, the program advances from the step S107 to a step S110.

The step S108 dumps PSD data from the present disc to the PSD data memory 503A. When the size of the PSD data in the present disc is equal to or smaller than the size of the PSD data memory 503A, all the PSD data is dumped from the present disc to the PSD data memory 503A. When the size of the PSD data in the present disc is greater than the size of the PSD data memory 503A, a former portion of the PSD data is dumped from the present disc to the PSD data memory 503A. In this case, the dumped portion of the PSD data is equal in size to the PSD data memory 503A, and thus the dumped portion of the PSD data fully occupies the PSD data memory 503A.

A step S109 following the step S108 sets a start list offset value to "0". After the step S109, the program advances to a step S118 which waits a next command inputted via the input device 504.

The step S110 decides whether or not PSD data in the PSD data memory 503A has been rewritten. When the PSD data in the PSD data memory 503A has been rewritten, the program advances from the step S110 to a step S111. Otherwise, the program jumps from the step S110 to a step S112. The step S111 dumps necessary sector-corresponding portions of the PSD data from the present disc to the PSD data memory 503A. After the step S111, the program advances to the step S112.

The step S112 sets the start list offset value equal to an interruption list offset value. It should be noted that the interruption list offset value denotes a position at which playback is interrupted. After the step S112, the program advances to the step S118. As previously described, the step S118 waits a next command inputted via the input device 504.

The step S114 decides whether or not the present disc is placed in the CD player 501 for the first time. When the present disc is placed in the CD player 501 for the first time, the program advances from the step S114 to a step S115. Otherwise, the program advances from the step S114 to a step S116.

The step S115 sets a start address into correspondence with a track "2" (a second track). After the step S115, the program advances to the step S118. As previously described, the step S118 waits a next command inputted via the input device 504.

The step S116 sets the start address equal to an interruption address. It should be noted that the interruption address denotes a position at which playback is interrupted. After the step S116, the program advances to the step S118. As previously described, the step S118 waits a next command inputted via the input device 504.

Basically, video CD's are of two types. Video CD's of the first type have PSD data while video CD's of the second type are void of PSD data. An example of a video CD of the first type is a video CD of the version "2.0". In the case of video CD's void of PSD data, interruption and restart of playback of tunes (programs) are implemented in response to address information rather than PSD information. Accordingly, in the program segment of FIG. 3, a decision is made at the step S106 as to whether or not the present disc is of the version "2.0", that is, whether or not the present disc is of the type having PSD data. In addition, processes implemented by steps following the step S106 are separated into two groups assigned to a disc having PSD data and a disc void of PSD data respectively.

Figure 4:
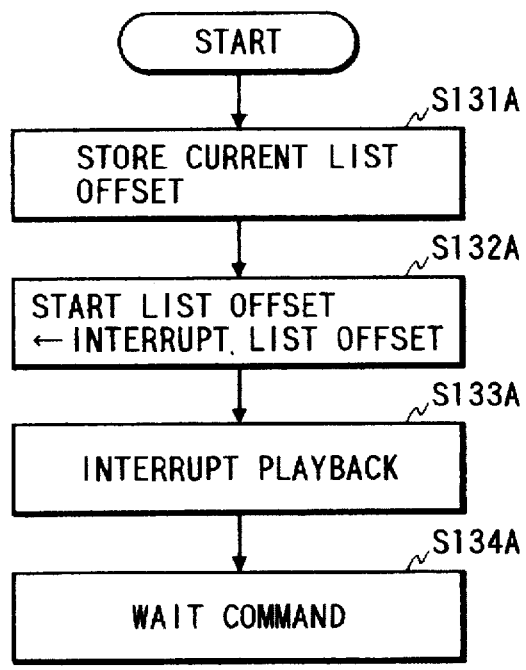
FIG. 4 is a flowchart of a second segment of the control program for the controller in FIG. 1.

FIG. 4 is a flowchart of a second segment of the control program for the controller 503. The program segment in FIG. 4 is started when a command of interrupting reproduction (playback) is fed to the controller 503 from the input device 504 in the case where a video CD currently in the CD player 501 is of the version "2.0".

As shown in FIG. 4, a first step S131A of the program segment stores a current list offset value into the RAM within the controller 503 as the interruption list offset value. In other words, the step S131A sets the interruption list offset value equal to the current list offset value. A step S132A following the step S131A sets the start list offset value equal to the current list offset value. A step S133A subsequent to the step S132A controls the servo circuit 505 to interrupt the reproduction (playback) of main information from the present CD. A step S134A following the step S133A waits a next command inputted via the input device 504.

Figure 5:
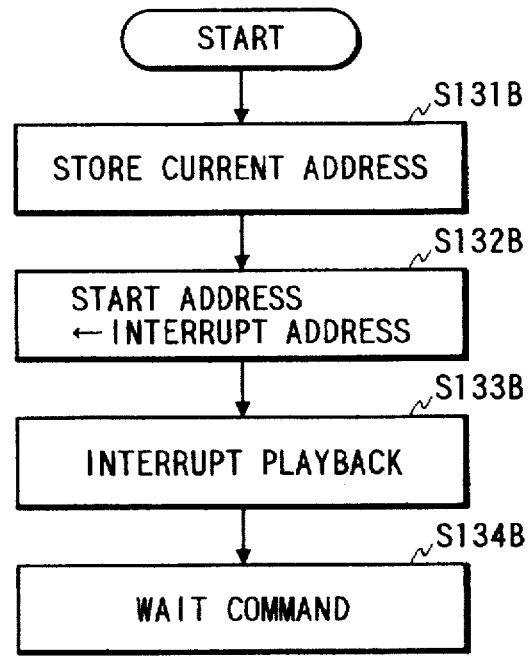
FIG. 5 is a flowchart of a third segment of the control program for the controller in FIG. 1.

FIG. 5 is a flowchart of a third segment of the control program for the controller 503. The program segment in FIG. 5 is started when a command of interrupting reproduction (playback) is fed to the controller 503 from the input device 504 in the case where a disc currently in the CD player 501 differs from the version "2.0".

As shown in FIG. 5, a first step S131B of the program segment stores a current address (representing a currently-accessed point on the present disc) into the RAM within the controller 503 as the interruption address. In other words, the step S131B sets the interruption address equal to the current address. A step S132B following the step S131B sets the start address equal to the current address. A step S133B subsequent to the step S132B controls the servo circuit 505 to interrupt the reproduction (playback) of main information from the present CD. A step S134B following the step S133B waits a next command inputted via the input device 504.

Figure 6:
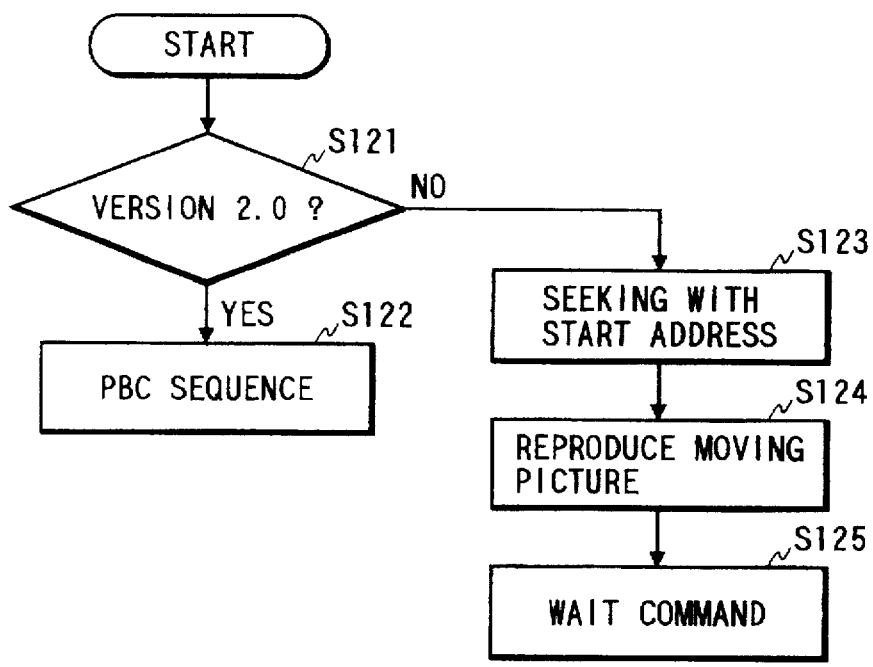
FIG. 6 is a flowchart of a fourth segment of the control program for the controller in FIG. 1.

FIG. 6 is a flowchart of a fourth segment of the control program for the controller 503. The program segment in FIG. 6 is started when a command of starting reproduction (playback) is fed to the controller 503 from the input device 504.

As shown in FIG. 6, a first step S121 of the program segment decides whether or not a disc currently in the CD player 501 is of the version "2.0". When the present disc is of the version "2.0", the program advances from the step S121 to a block S122. Otherwise, the program advances from the step S121 to a step S123. The block S122 executes a PBC sequence. The step S123 retrieves the start address. Then, the step S123 controls the servo circuit 505 to provide seeking motion of the optical pickup head in response to the start address. As a result of the seeking motion, the optical pickup head is located at a desired position corresponding to the start address. A step S124 following the step S123 starts reproducing information of a moving picture from the present disc. A step S125 subsequent to the step S124 waits a next command inputted via the input device 504.

During the execution of the PBC sequence by the block S122, access flags related to accessed banks of the PSD data memory 503A are set to "1" as previously described with reference to FIG. 2. A step in the block S122 executes setting of such an access flag to "1". During the execution of the PBC sequence by the block S122, PSD data is read out from the PSD data memory 503A and desired tunes (desired programs) are sequentially reproduced according to the readout PSD data.

Figure 7:
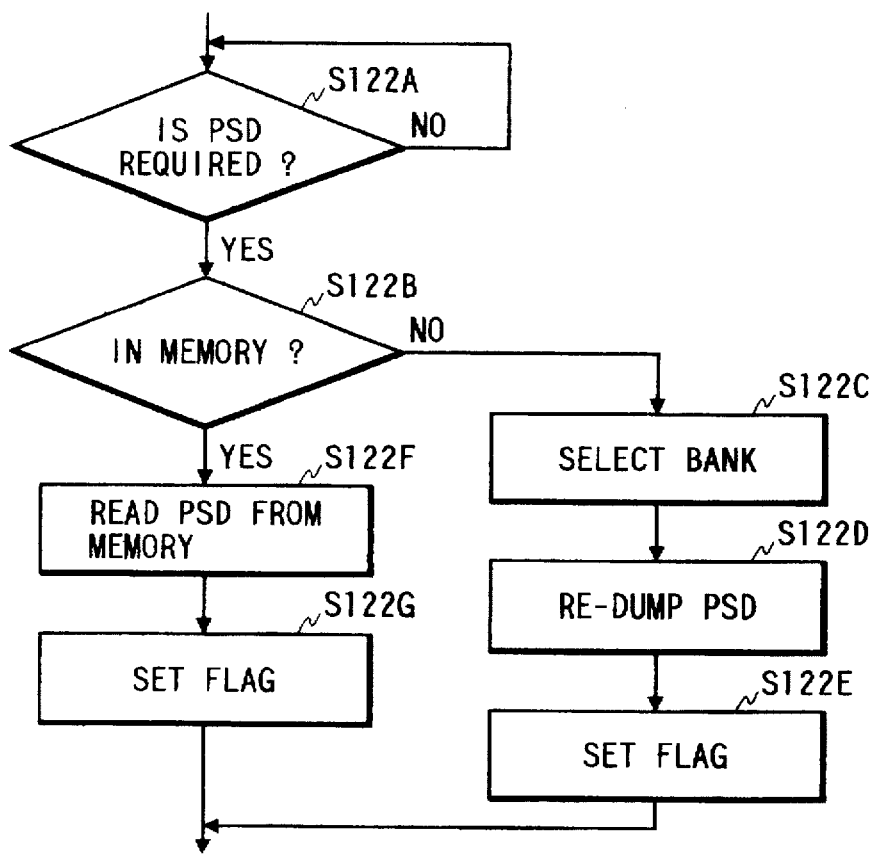
FIG. 7 is a flowchart of a portion of a block in FIG. 6.

FIG. 7 shows a portion of the block S122. With reference to FIG. 7, a step S122A decides whether or not a sector-corresponding PSD data portion is required. When a sector-corresponding PSD data portion is required, the program advances from the step S122A to a step S122B. Otherwise, the step S122A is repeated. The step S122B decides whether or not the required sector-corresponding PSD data portion is present in the PSD data memory 503A. When the required sector-corresponding PSD data portion is present in the PSD data memory 503A, the program advances from the step S122B to a step S122F. Otherwise, the program advances from the step S122B to a step S122C.

The step S122F reads out the required sector-corresponding PSD data portion from the PSD data memory 503A. A step S122G following the step S122F sets the access flag to "1" which relates to the bank of the PSD data memory 503A which stores the required sector-corresponding PSD data portion.

The step S122C selects a bank out of the banks of the PSD data memory 503A in accordance with predetermined selection rules. For example, the step S122C selects the last one of the banks of the PSD data memory 503A which have not yet been accessed. A step S122D following the step S122C controls the servo circuit 505 to implement a re-dumping process. Specifically, the required sector-corresponding PSD data portion is dumped from the present disc to the selected bank of the PSD data memory 503A. In addition, the step S122D feeds the required sector-corresponding PSD data portion to a requirement-source segment of the controller 503. A step S122E following the step S122D sets the access flag to "1" which relates to the selected bank of the PSD data memory 503A.

The steps 122G and 122E are followed by a subsequent step in the block S122.

It should be noted that the CD player 501 may be replaced by another video disc player such as a DVD player. In this case, video discs such as DVD's are handled instead of discs of the CD family.

Second Embodiment

Figure 8:
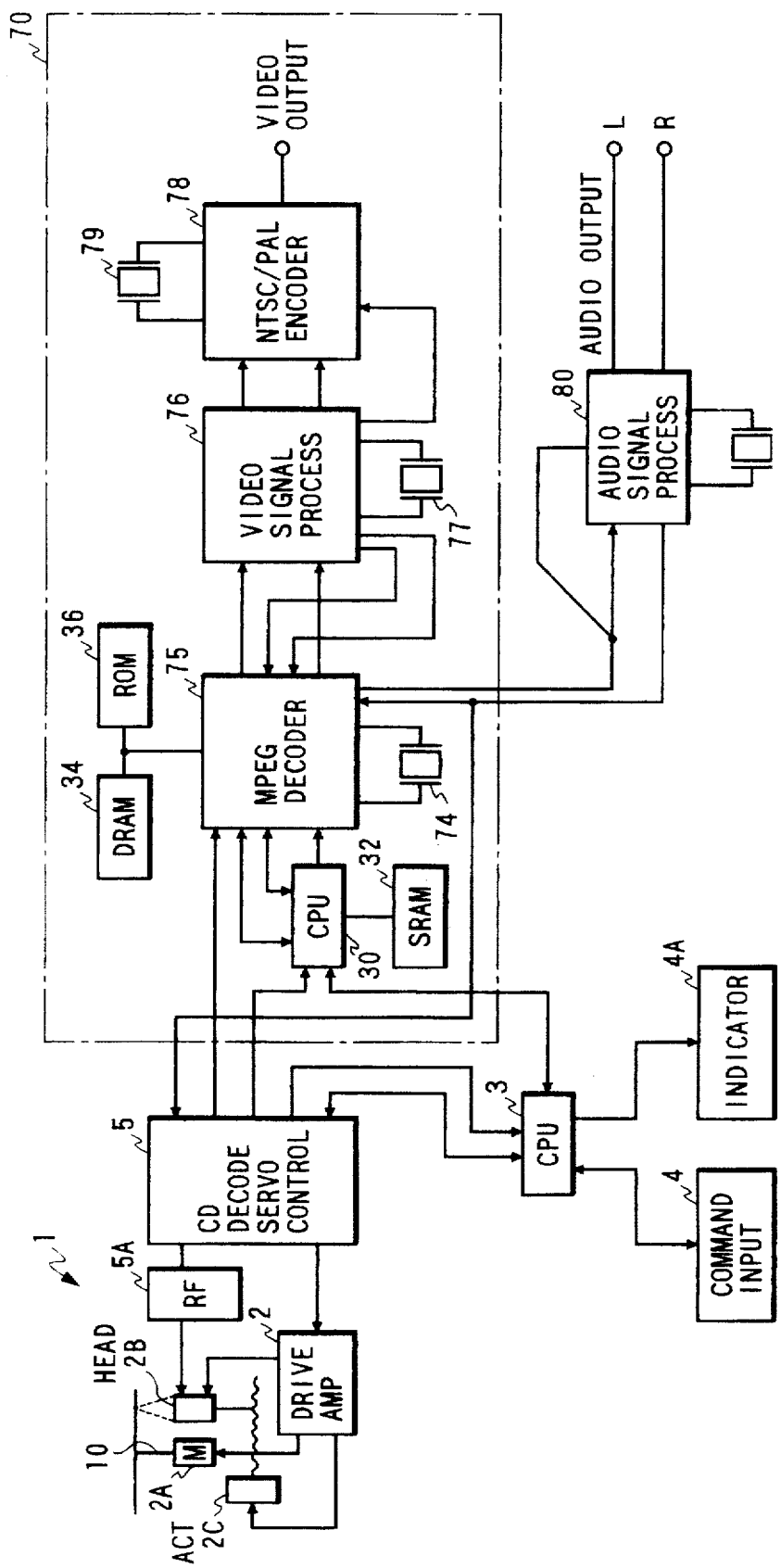
FIG. 8 is a block diagram of a reproducing apparatus according to a second embodiment of this invention.

FIG. 8 shows a second embodiment of this invention which is similar to the embodiment of FIGS. 1-7 except for design changes indicated later.

With reference to FIG. 8, a reproducing apparatus includes a CD player 1 which has a spindle motor 2A, an optical pickup head 2B, an actuator 2C for the optical pickup head 2B, and a drive amplifier 2. The spindle motor 2A serves to rotate a spindle 10. A CD or a video CD placed in position within the CD player 1 rotates as the spindle 10 rotates. The drive amplifier 2 is electrically connected to the spindle motor 2A, the optical pickup head 2B, and the head actuator 2C. The CD player 1 corresponds to the CD player 501 in FIG. 1.

The reproducing apparatus of FIG. 8 also includes a CPU 3, a command input section 4, an indicator 4A, a CD decoder/servo control circuit 5, and an RF section 5A. The RF section 5A is electrically connected between the optical pickup head 2B and the CD decoder/servo control circuit 5. The CD decoder/servo control circuit 5 is electrically connected to the drive amplifier 2 and the CPU 3. The CPU 3 is electrically connected to the command input section 4 and the indicator 4A.

The CPU 3 corresponds to the controller 503 in FIG. 1. The command input section 4 corresponds to the input device 504 in FIG. 1. The CD decoder/servo control circuit 5 corresponds to the signal processor 502 and the servo circuit 505 in FIG. 1.

The reproducing apparatus of FIG. 8 further includes a signal processing and video reproducing section 70 and an audio signal processing circuit 80. The signal processing and video reproducing section 70 is connected to the CD decoder/servo control circuit 5 and the CPU 3. The audio signal processing circuit 80 is connected to the CD decoder/servo control circuit 5 and the signal processing and video reproducing section 70.

The signal processing and video reproducing section 70 includes a CPU 30, an SRAM 32, a DRAM 34, a ROM 36, an MPEG decoder 75, a video signal processing circuit 76, an NTSC/PAL encoder 78, and crystal resonators 74, 77, and 79. The CPU 30 is connected to the CPU 3, the CD decoder/servo control circuit 5, the SRAM 32, and the MPEG decoder 75. The DRAM 34 and the ROM 36 are connected to the MPEG decoder 75. The video signal processing circuit 76 is connected between the MPEG decoder 75 and the NTSC/PAL encoder 78. The crystal resonator 74 is connected to the MPEG decoder 75 for generating a fixed-frequency clock signal in the MPEG decoder 75. The crystal resonator 77 is connected to the video signal processing circuit 76 for generating a fixed-frequency clock signal in the video signal processing circuit 76. The crystal resonator 79 is connected to the NTSC/PAL encoder 78 for generating a fixed-frequency clock signal in the NTSC/PAL encoder 78. The MPEG decoder 75 is connected to the CD decoder/servo control circuit 5 and the audio signal processing circuit 80. The video signal processing circuit 76 includes an interface, a D/A converter, and a sync signal generator.

The CPU 30 corresponds to the controller 503 in FIG. 1. The SRAM 32 corresponds to the PSD data memory 503A in FIG. 1. Alternatively, a RAM within the CPU 3 or a RAM within the CPU 30 may correspond to the PSD data memory 503A in FIG. 1.

The audio signal processing circuit 80 is connected to the CD decoder/servo control circuit 5 and the MPEG decoder 75. The audio signal processing circuit 80 includes a digital filter and a D/A converter.

A signal having video information and audio information is reproduced from a video CD by the optical pickup head 2B. The reproduced signal is transmitted from the optical pickup head 2B to the CD decoder/servo control circuit 5 via the RF section 5A. The reproduced signal is subjected by the CD decoder/servo control circuit 5 to a CD decoding process inverse with respect to a CD encoding process. The resultant reproduced signal is fed from the CD decoder/servo control circuit 5 to the MPEG decoder 75, being subjected by the MPEG decoder 75 to an MPEG decoding process inverse with respect to an MPEG encoding process. The MPEG decoding process recovers original video information and original audio information from the reproduced signal fed to the MPEG decoder 75. The recovered video information is transmitted from the MPEG decoder 75 to the NTSC/PAL encoder 78 via the video signal processing circuit 76. The video information is encoded by the NTSC/PAL encoder 78 into a video signal of an NTSC format or a PAL format. The video signal of the NTSC format or the PAL format is transmitted from the NTSC/PAL encoder 78 to an external device (not shown) as an output video signal from the reproducing apparatus of FIG. 8. The recovered audio information is transmitted from the MPEG decoder 75 to the audio signal processing circuit 80. The audio information is converted and separated by the audio signal processing circuit 80 into a left-channel audio signal and a right-channel audio signal. The left-channel audio signal and the right-channel audio signal are transmitted from the audio signal processing circuit 80 to an external device (not shown) as output audio signals from the reproducing apparatus of FIG. 8.

The CPU 3 has a combination of an input/output port, a signal processing section, a ROM, and a RAM. The CPU 3 operates in accordance with a control program stored in the internal ROM. Similarly, the CPU 30 has a combination of an input/output port, a signal processing section, a ROM, and a RAM. The CPU 30 operates in accordance with a control program stored in the internal ROM.

When a disc is placed in position within the CD player 1, TOC (table of contents) information is read out from the present disc. An output signal of the CD decoder/servo control circuit 5 which contains the TOC information is processed by the signal processing and video reproducing section 70. The signal processing and video reproducing section 70 recovers the TOC information, and feeds the recovered TOC information to the CPU 3. The CPU 3 detects or recognizes the type of the present disc by referring to the TOC information. The CPU 3 generates a signal representing the type of the present disc, and outputs the disc type signal to the indicator 4A. Information of the type of the present disc is visualized by the indicator 4A.

Operation of the reproducing apparatus of FIG. 8 is changeable among different modes such as "play", "stop", "search", and "pause". The command input section 4 includes function keys for designating the different modes of operation of the reproducing apparatus respectively. The command input section 4 also includes keys for designating the identification number or the order number of a desired tune (a desired program). The function keys and the other keys in the command input section 4 can be operated by a user.

When the command input section 4 is actuated by the user to designate the identification number or the order number of a desired tune (a desired program), the command input section 4 generates a signal representing the order number of the desired tune. The command input section 4 outputs the signal of the desired-tune order number to the CPU 3. The CPU 3 generates a control signal in response to the signal of the desired-tune order number, and outputs the generated control signal to the CD decoder/servo control circuit 5. The CD decoder/servo control circuit 5 adjusts the head actuator 2C via the drive amplifier 2 in response to the control signal from the CPU 3 so that the optical pickup head 2B moves from the current position to a new position corresponding to the start of the desired tune.

After TOC information is read out from a disc in position within the CD player 1, the CPU 3 decides whether the present disc agrees with an audio disc or a data disc on the basis of the TOC information. When the present disc is founded to be a data disc, the CPU 3 detects or recognizes the mode (the type or version) of the present disc by referring to subcode information reproduced from the present disc. In the case where an identification code signal in the subcode information is "20H", the CPU 3 finds the present disc to be a recording disc for DV (digital video).

When the present disc is founded to a data disc, the CPU 30 checks whether or not a data stream is recorded on the present disc in the form II of the mode II by analyzing information reproduced from the present disc. In the case where the recording form of the data stream on the present disc agrees with the form II of the mode II, the CPU 30 regards the present disc as a recording disc for DV. The CPU 30 informs the CPU 3 of the result of the check.

In general, the recording area of a CD or a video CD is divided into portions assigned to tunes (programs) respectively. Such recording area portions will be referred to as tracks hereinafter.

In the case of a recording disc for DV (digital video), a first track is occupied by non-tune data different from data representing a tune (a program) while second and later tracks are occupied by tune data. On the other hand, in the case of a normal CD, even a first track is occupied by data representing a tune (a program). Regarding a recording disc for DV, a first track is supposed to be occupied by a first-tune data, and tunes (programs) represented by data in second and later tracks are regarded as second and later tunes respectively. Accordingly, in the case of a recording disc for DV, the used or defined tune order number shifts and increases from the actual tune order number by one.

After TOC information is read out from a disc in position within the CD player 1, the CPU 3 receives the reproduced TOC information from the CD decoder/servo control circuit 5. Then, the CPU 3 decides whether or not the present disc agrees with an audio disc on the basis of the TOC information. When the present disc agrees with an audio disc, the CPU 3 sets a flag for a CD to "1". Then, the CPU 3 reads out operation mode information which is generated by the command input section 4 in response to actuation of the function keys therein. The CPU 3 generates a control signal in response to the operation mode information, and outputs the generated control signal to the CD decoder/servo control circuit 5. The CD decoder/servo control circuit 5 adjusts the head actuator 2C via the drive amplifier 2 in response to the control signal from the CPU 3, thereby implementing servo control of the optical pickup head 2B with respect to the present disc.

When the present disc disagrees with an audio disc, the CPU 3 receives the reproduced subcode information from the CD decoder/servo control circuit 5. The CPU 3 may receive the reproduced subcode information from the signal processing and video reproducing section 70. Then, the CPU 3 decides whether or not the present disc agrees with a recording disc for DV by referring to the subcode information.

In the case where the present disc agrees with a recording disc for DV, the CPU 3 controls the CD decoder/servo control circuit 5 so that non-tune data (auxiliary information) will be reproduced from a track "1" (a first track) of the present disc. Then, the CPU 3 waits the result of the check on the data-stream recording form which is executed by the CPU 30. After the reception of the check result, the CPU 3 decides whether or not the non-tune data has been normally reproduced by referring to the check result. In the case where the non-tune data has been normally reproduced, the CPU 3 sets a flag for DV to "1". Then, the CPU 3 reads out information representative of user's request from the command input section 4. The CPU 3 subjects the user's request information to conversion such that the order number of a tune (a program) assigned to a second track will be changed back to the actual order number, that is, "first". The CPU 3 generates a control signal in response to the conversion-resultant information, and outputs the generated control signal to the CD decoder/servo control circuit 5. The CD decoder/servo control circuit 5 adjusts the head actuator 2C via the drive amplifier 2 in response to the control signal from the CPU 3, thereby implementing servo control of the optical pickup head 2B with respect to the present disc. Subsequently, the CPU 3 reads out information representative of user's request from the command input section 4 again.

On the other hand, in the case where the non-tune data has not been normally reproduced, the CPU 3 generates a signal representing a reproduction failure. The CPU 3 outputs the reproduction failure signal to the indicator 4A. The reproduction failure signal is visualized by the indicator 4A.

In the case where the present disc disagrees with a recording disc for DV, the CPU 3 decides whether or not the present disc agrees with a CD-I (compact disc-interactive). When the present disc agrees with a CD-I, the CPU 3 controls the CD decoder/servo control circuit 5 so that disc information will be reproduced from a track "1" (a first track) of the present disc. Subsequently, the CPU 3 decides whether or not the present disc agrees with a CDI-FMV (full motion video). In the case where the present disc agrees with a CDI-FMV, the CPU 3 reads out information representative of user's request from the command input section 4. The CPU 3 generates a control signal in response to the user's request information, and outputs the generated control signal to the CD decoder/servo control circuit 5. The CD decoder/servo control circuit 5 adjusts the head actuator 2C via the drive amplifier 2 in response to the control signal from the CPU 3, thereby implementing servo control of the optical pickup head 2B with respect to the present disc.

In the case where the present disc agrees with neither a CD-I nor a CDI-FMV, the CPU 3 generates a signal representing a reproduction failure. The CPU 3 outputs the reproduction failure signal to the indicator 4A. The reproduction failure signal is visualized by the indicator 4A.

It should be noted that the CD player 1 may be replaced by another video disc player such as a DVD player. In this case, video discs such as DVD's are handled instead of discs of the CD family.

Third Embodiment

Figure 9:
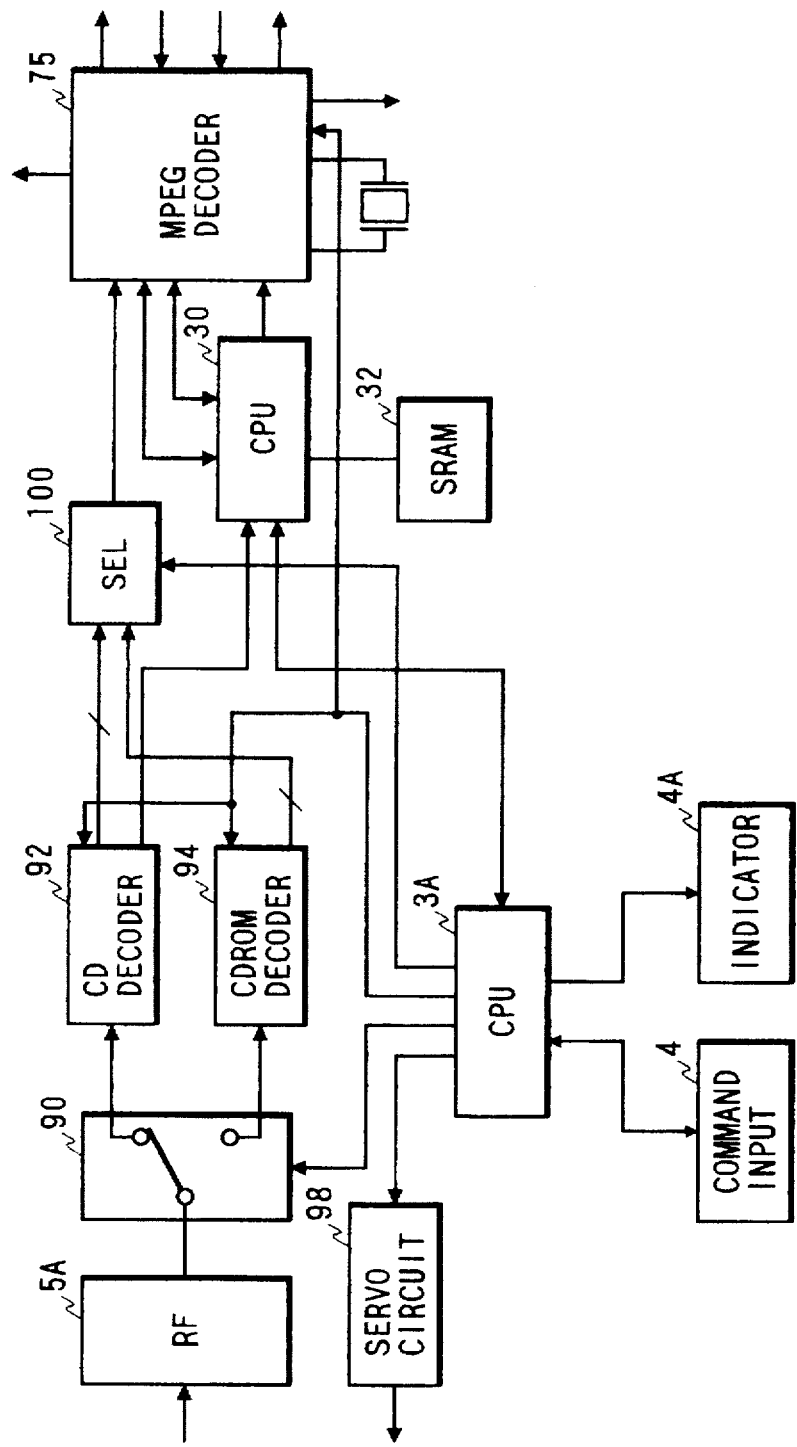
FIG. 9 is a block diagram of a portion of a reproducing apparatus according to a third embodiment of this invention.

FIG. 9 shows a third embodiment of this invention which is similar to the embodiment of FIG. 8 except for design changes indicated hereinafter.

The embodiment in FIG. 9 uses a CPU 3A instead of the CPU 3 (see FIG. 8). The embodiment in FIG. 9 includes a CD decoder 92 and a CD ROM decoder 94 which correspond to a CD decoding section of the CD decoder/servo control circuit 5 in FIG. 8. The embodiment of FIG. 9 also includes a switch 90 connected among an RF section 5A, the CD decoder 92, and the CD ROM decoder 94. The switch 90 has a control terminal connected to the CPU 3A.

The embodiment in FIG. 9 further includes a selector 100 connected among the CD decoder 92, the CD ROM decoder 94, and an MPEG decoder 75. The selector 100 has a control terminal connected to the CPU 3A. The embodiment in FIG. 9 also includes a servo circuit 98 corresponding to a servo control section of the CD decoder/servo control circuit 5 in FIG. 8. The servo circuit 98 is connected to the CPU 3A.

When a disc is placed in position within a CD player 1 (see FIG. 8), TOC information is read out from the present disc. The CPU 3A controls the switch 90 to connect the RF section 5A and the CD decoder 92. Accordingly, an output signal of the RF section 5A which contains the TOC information is transmitted to and processed by the CD decoder 92. The CD decoder 92 recovers the TOC information. The CD decoder 92 feeds the TOC information to the CPU 3A. The CPU 3A detects or recognizes the type of the present disc by referring to the TOC information. The CPU 3A generates a signal representing the type of the present disc, and outputs the disc type signal to the indicator 4A. Information of the type of the present disc is visualized by the indicator 4A.

When a command input section 4 is actuated by a user to designate the identification number or the order number of a desired tune (a desired program), the command input section 4 generates a signal representing the order number of the desired tune. The command input section 4 outputs the signal of the desired-tune order number to the CPU 3A. The CPU 3A generates a control signal in response to the signal of the desired-tune order number, and outputs the generated control signal to the servo circuit 98. The servo circuit 98 adjusts a head actuator 2C (see FIG. 8) via a drive amplifier 2 (see FIG. 8) in response to the control signal from the CPU 3A so that an optical pickup head 2B (see FIG. 8) moves from a current position to a new position corresponding to the start of the desired tune.

After TOC information is read out from a disc in position within the CD player 1, the CPU 3A decides whether the present disc agrees with an audio disc (a CD-DA) or a data disc on the basis of the TOC information. When the present disc is founded to be a data disc, the CPU 3A detects or recognizes the data format mode of the present disc by referring to subcode information reproduced from the present disc. In the case where an identification code signal in the subcode information is "20H", the CPU 3A finds the present disc to be a recording disc for DV.

When the present disc is founded to a data disc, the CPU 30 checks whether or not the format of the data on the present disc agrees with the form II in the mode II by analyzing information reproduced from the present disc. In the case where the format of the data agrees with the form II in the mode II, the CPU 30 regards the present disc as a recording disc for DV. The CPU 30 informs the CPU 3A of the result of the check.

As previously described, in the case where the identification code signal is "20H", the present disc is found to be a recording disc for DV. Also, a "karaoke" CD is identified to be a recording disc for DV.

When a disc is placed in position within the CD player 1 (see FIG. 8), the CPU 3A controls the selector 100 to connect the CD decoder 92 and the MPEG decoder 75. In the case where the present disc is found to be not an audio disc (a CD-DA), the output signal of the CD decoder 92 is transmitted to the MPEG decoder 75 via the selector 100. The output signal of the CD decoder 92 is subjected by the MPEG decoder 75 to a decoding process based on the MPEG1 standards. The CPU 30 checks the decoding-resultant signal to decide whether or not the output signal of the CD decoder 92 conforms to the MPEG1 standards. The CPU 30 informs the CPU 3A of the check result. When the CPU 3A is informed that the output signal of the CD decoder 92 does not conform to the MPEG1 standards, the CPU 3A changes the switch 90 and the selector 100 so that the CD ROM decoder 94 will be used instead of the CD decoder 92. Accordingly, the output signal of the CD ROM decoder 94 is subjected by the MPEG decoder 75 to the decoding process based on the MPEG1 standards. The CPU 30 checks the decoding-resultant signal to decide whether or not the output signal of the CD ROM decoder 94 conforms to the MPEG1 standards. The CPU 30 informs the CPU 3A of the check result. When the CPU 3A is informed that the output signal of the CD ROM decoder 94 conforms to the MPEG1 standards, the CPU 3A controls the servo circuit 98 to start a main part of the reproduction (the playback).

In the case where the present disc is found to be a CDI-FMV, the CPU 3A controls the switch 90 and the selector 100 to use the CD ROM decoder 94. Accordingly, the output signal of the CD ROM decoder 94 is subjected by the MPEG decoder 75 to the decoding process based on the MPEG1 standards. The CPU 30 checks the decoding-resultant signal to decide whether or not the output signal of the CD ROM decoder 94 conforms to the MPEG1 standards. The CPU 30 informs the CPU 3A of the check result. When the CPU 3A is informed that the output signal of the CD ROM decoder 94 does not conform to the MPEG1 standards, the CPU 3A decides whether or not the present disc agrees with a recording disc for DV.

Fourth Embodiment

Figure 10:
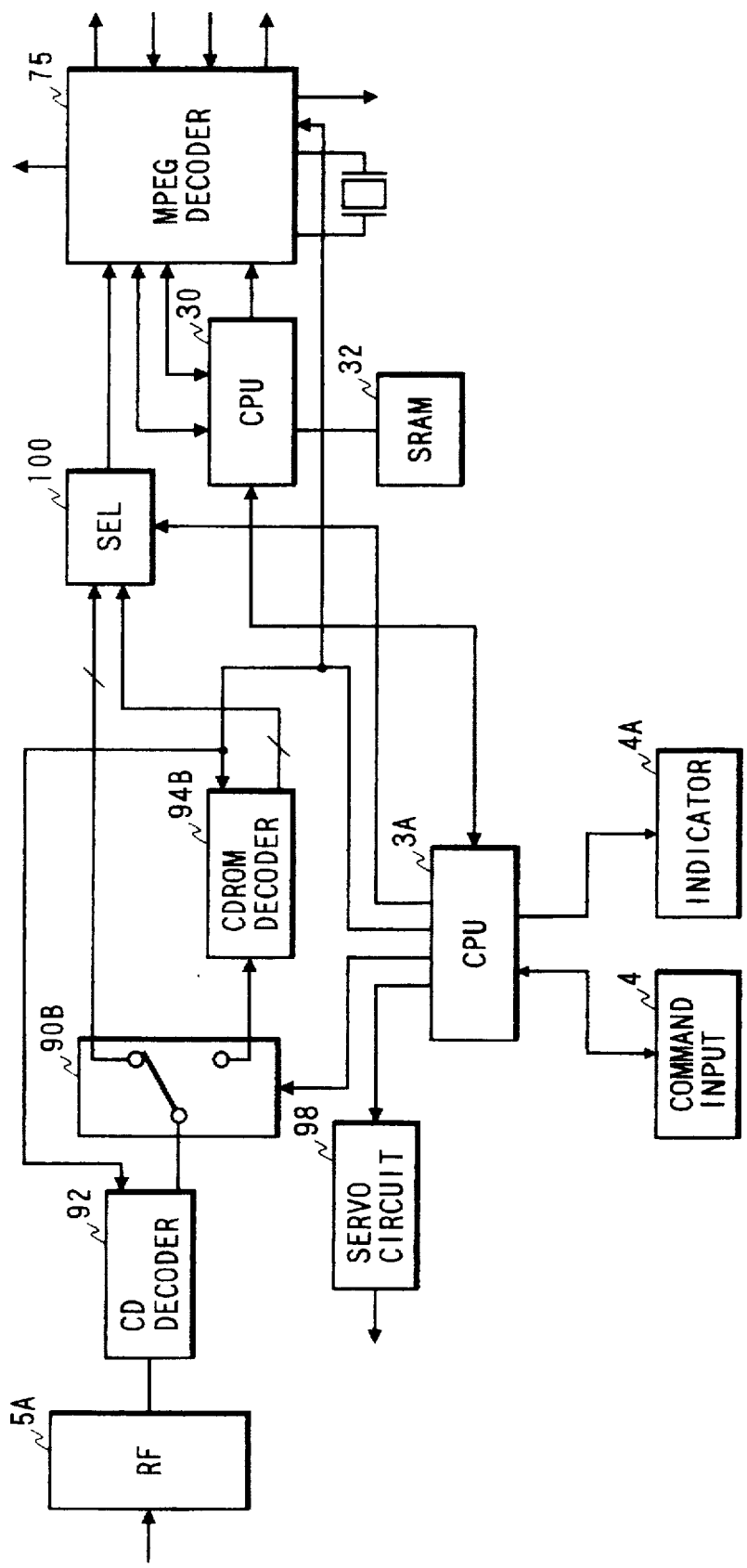
FIG. 10 is a block diagram of a portion of a reproducing apparatus according to a fourth embodiment of this invention.

FIG. 10 shows a fourth embodiment of this invention which is similar to the embodiment of FIG. 9 except for design changes indicated hereinafter.

In the embodiment of FIG. 10, an RF section 5A is successively followed by a CD decoder 92 and a switch 90B. The switch 90B is connected to a CD ROM decoder 94B and a selector 100. The switch 90B has a control terminal connected to a CPU 3A. The CD ROM decoder 94B is connected to the selector 100.

The CPU 3A controls the switch 90B and the selector 100 so that the output signal of a CD decoder 92 will be directly transmitted to an MPEG decoder 75 or will be indirectly transmitted thereto via the CD ROM decoder 94B.

In the embodiment of FIG. 10, the CD decoder 92 includes an EFM decoder and an error correction circuit. On the other hand, the CD ROM decoder 94B is void of an EFM decoder and an error correction circuit. The CD ROM decoder 94B has a section for implementing a de-scrambling process on a reproduced signal, a section for separating a sync signal from the reproduced signal, and a section for separating a header signal and a sub-header signal from the reproduced signal.

What is claimed is:

1. A reproducing apparatus for a video disc, comprising:
   a memory having divided regions corresponding to banks respectively, wherein different access flags are assigned to the banks of the memory respectively;
   first means for dumping sector-corresponding PSD data portions from the video disc to the banks of the memory respectively;
   second means for detecting whether or not a desired sector-corresponding PSD data portion is in the memory;
   third means for reading out the desired sector-corresponding PSD data portion from the memory when the first means detects that the desired sector-corresponding PSD data portion is in the memory, and for changing a state of an access flag assigned to a bank of the memory, which stores the desired sector-corresponding PSD data portion, to enable said access flag to indicate that said bank of the memory has been subjected to a data reading process by the third means; and
   fourth means for, when the second means detects that the desired sector-corresponding PSD data portion is not in the memory, dumping the desired sector-corresponding PSD data potion from the video disc to a bank of the memory which relates to an access flag indicating that said bank of the memory has not yet been subjected to a data reading process by the third means.

2. A reproducing apparatus as recited in claim 1, further comprising fifth means for, when the video disc is replaced by a second video disc having sector-corresponding PSD data portions whose number is smaller than the number of the banks of the memory, dumping the sector-corresponding PSD data portions from the second video disc to banks out of the banks of the memory respectively while keeping the sector-corresponding PSD data portion in each remaining bank of the memory.

3. A reproducing apparatus as recited in claim 2, further comprising sixth means for, when the second video disc is replaced by the previous video disc, dumping sector-corresponding PSD data portions from the previous video disc to banks of the memory which have been occupied by the sector-corresponding PSD data portions related to the second video disc.

4. A method of reproducing information from a video disc, comprising the steps of:
   dumping sector-corresponding PSD data portions from the video disc to banks of a memory respectively, wherein different access flags are assigned to the banks of the memory respectively;
   detecting whether or not a desired sector-corresponding PSD data portion is in the memory;
   reading out the desired sector-corresponding PSD data portion from the memory when the desired sector-corresponding PSD data portion is in the memory, and changing a state of an access flag assigned to a bank of the memory, which stores the desired sector-corresponding PSD data portion, to enable said access flag to indicate that said bank of the memory has been subjected to a data reading process; and
   when the desired sector-corresponding PSD data portion is not in the memory, dumping the desired sector-corresponding PSD data portion from the video disc to a bank of the memory which relates to an access flag indicating that said bank of the memory has not yet been subjected to a data reading process.

5. A method as recited in claim 4, further comprising the steps of:
   when the video disc is replaced by a second video disc having sector-corresponding PSD data portions whose number is smaller than the number of the banks of the memory, dumping the sector-corresponding PSD data portions from the second video disc to banks out of the banks of the memory respectively while keeping the sector-corresponding PSD data portion in each remaining bank of the memory; and
   when the second video disc is replaced by the previous video disc, dumping sector-corresponding PSD data portions from the previous video disc to banks of the memory which have been occupied by the sector-corresponding PSD data portions related to the second video disc.

6. A method as recited in claim 4, further comprising the steps of:
   reproducing main information from the video disc in response to a sector-corresponding PSD data portion read out from the memory;

when the reproduction of the main information from the video disc is interrupted, storing a list offset value representing a position corresponding to the occurrence of the interruption of the reproduction; and when the reproduction of the main information from the video disc is required to be restarted, retrieving the list offset value and restarting the reproduction from the position represented by the retrieved list offset value.

7. A method as recited in claim 4, further comprising the steps of:

reproducing main information from the video disc in response to a sector-corresponding PSD data portion read out from the memory;

when the reproduction of the main information from the video disc is interrupted, storing an address representing a position corresponding to the occurrence of the interruption of the reproduction; and when the reproduction of the main information from the video disc is required to be restarted, retrieving the address and restarting the reproduction from the position represented by the address.

8. A method as recited in claim 4, further comprising the steps of:

when reproducing main information from the video disc is required, deciding whether or not the video disc conforms to given standards;

reading a start list offset value and starting the reproduction of the main information from the video disc in response to the start list offset value in cases where the video disc conforms to given standards; and reading a start address and starting the reproduction of the main information from the video disc in response to the start address in cases where the video disc does not conform to given standards.

9. A reproducing apparatus as recited in claim 1, wherein the fourth means is operative for changing a state of the access memory assigned to the bank of the memory to which the desired sector-corresponding PSD data portion is dumped.

10. A method as recited in claim 4, further comprising the step of changing a state of the access memory assigned to the bank of the memory to which the desired sector-corresponding PSD data portion is dumped.

11. A reproducing apparatus for a video disc, comprising:

a memory having divided regions corresponding to banks respectively;

first means for dumping sector-corresponding PSD data portions from the video disc to the banks of the memory respectively;

second means for detecting whether or not a desired sector-corresponding PSD data portion is in the memory;

third means for reading out the desired sector-corresponding PSD data portion from the memory when the second means detects that the desired sector-corresponding PSD data portion is in the memory;

fourth means for, when the second means detects that the desired sector-corresponding PSD data portion is not in the memory, dumping the desired sector-corresponding PSD data portion from the video disc to a bank of the memory which has not yet been subjected to a data reading process by the third means; and fifth means for, when the video disc is replaced by a second video disc having sector-corresponding PSD data portions whose number is smaller than the number of the banks of the memory, dumping the sector-corresponding PSD data portions from the second video disc to banks out of the banks of the memory respectively while keeping the sector-corresponding PSD data portion in each remaining bank of the memory.

12. A method of reproducing information from a video disc, comprising the steps of:

dumping sector-corresponding PSD data portions from the video disc to banks of a memory respectively;

detecting whether or not a desired sector-corresponding PSD data portion is in the memory;

reading out the desired sector-corresponding PSD data portion from the memory when the desired sector-corresponding PSD data portion is in the memory; and when the desired sector-corresponding PSD data portion is not in the memory, dumping the desired sector-corresponding PSD data portion from the video disc to a bank of the memory which has not yet been subjected to a data reading process;

when the video disc is replaced by a second video disc having sector-corresponding PSD data portions whose number is smaller than the number of the banks of the memory, dumping the sector-corresponding PSD data portions from the second video disc to banks out of the banks of the memory respectively while keeping the sector-corresponding PSD data portion in each remaining bank of the memory; and when the second video disc is replaced by the previous video disc, dumping sector-corresponding PSD data portions from the previous video disc to banks of the memory which have been occupied by the sector-corresponding PSD data portions related to the second video disc.

* * * * *

UNITED STATES PATENT AND TRADEMARK OFFICE
CERTIFICATE OF CORRECTION

PATENT NO. : 5,761,374
DATED : June 2, 1998
INVENTOR(S) : Junichi Kagoshima

It is certified that error appears in the above-identified patent and that said Letters Patent is hereby corrected as shown below:

On the title page insert item [30],

-- [30] Foreign Application Priority Data

June 15, 1995   [JP] Japan  . . . . 7-172677 --

Signed and Sealed this

Thirtieth Day of March, 1999

Attest:

Q. TODD DICKINSON

*Attesting Officer*      *Acting Commissioner of Patents and Trademarks*